US011305718B2

(12) United States Patent
Ko et al.

(10) Patent No.: US 11,305,718 B2
(45) Date of Patent: Apr. 19, 2022

(54) DRIVER AIRBAG MODULE WITH LIGHTING DEVICE

(71) Applicant: HYUNDAI MOBIS CO., LTD., Seoul (KR)

(72) Inventors: Seok Hoon Ko, Yongin-si (KR); Do Hyoung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/953,023

(22) Filed: Nov. 19, 2020

(65) Prior Publication Data

US 2022/0080919 A1     Mar. 17, 2022

(30) Foreign Application Priority Data

Sep. 15, 2020   (KR) .......................... 10-2020-0118580

(51) Int. Cl.
| | | |
|---|---|---|
| *B60R 21/203* | (2006.01) | |
| *B60Q 3/283* | (2017.01) | |
| *B60R 21/2165* | (2011.01) | |
| *B60Q 3/80* | (2017.01) | |
| *B60R 13/00* | (2006.01) | |

(52) U.S. Cl.
CPC ........ *B60R 21/21656* (2013.01); *B60Q 3/283* (2017.02); *B60Q 3/80* (2017.02); *B60R 13/005* (2013.01); *B60R 21/203* (2013.01)

(58) Field of Classification Search
CPC ............. B60R 21/203; B60R 21/2032; B60R 21/21656; B60R 2021/21543; B60R 3/283

See application file for complete search history.

(56) References Cited

U.S. PATENT DOCUMENTS

| | | | | |
|---|---|---|---|---|
| 6,099,027 | A * | 8/2000 | Shirk .................... | B60R 13/005 280/728.3 |
| 6,145,402 | A * | 11/2000 | Nishitani ............... | B62D 1/105 439/34 |
| 7,887,088 | B2 * | 2/2011 | Worrell ............. | B60R 21/21658 280/731 |
| 8,925,959 | B2 * | 1/2015 | Bosch .................... | B60Q 3/283 280/728.3 |
| 10,279,736 | B2 | 5/2019 | Schneider et al. | |
| 10,507,764 | B2 | 12/2019 | Schneider et al. | |

(Continued)

FOREIGN PATENT DOCUMENTS

| | | | |
|---|---|---|---|
| JP | 5506630 | B2 | 5/2014 |
| KR | 10-2011-0074888 | A | 7/2011 |

*Primary Examiner* — Barry Gooden, Jr.
(74) *Attorney, Agent, or Firm* — NovoTechIP International PLLC

(57) ABSTRACT

A driver airbag module with a lighting device installed in a steering wheel of a vehicle is proposed. The driver airbag module includes an inner cover extending in a direction of a plane parallel to the steering wheel and having an accommodation space recessed downwards; an emblem panel accommodated in the accommodation space to be disposed in an upper portion of the inner cover and integrally coupled with the inner cover; a lighting device accommodated in the accommodation space to be disposed between the emblem panel and the inner cover; and an outer cover extending in the direction of the plane parallel to the steering wheel and integrally coupled with an upper surface of the inner cover while covering the emblem panel and the inner cover.

11 Claims, 6 Drawing Sheets

(56) References Cited

U.S. PATENT DOCUMENTS

| | | | |
|---|---|---|---|
| 11,059,447 B2* | 7/2021 | Ide | B60R 21/21656 |
| 2001/0052694 A1* | 12/2001 | Schutz | B60Q 1/0082 |
| | | | 280/731 |
| 2006/0125217 A1* | 6/2006 | Nakamura | B60R 13/005 |
| | | | 280/731 |
| 2007/0024034 A1* | 2/2007 | Thomas | B60R 21/21656 |
| | | | 280/731 |
| 2007/0099465 A1* | 5/2007 | Ruetz | B60Q 1/1461 |
| | | | 439/164 |
| 2008/0090031 A1* | 4/2008 | Hirzmann | G09F 13/22 |
| | | | 428/31 |
| 2009/0121459 A1* | 5/2009 | Bostick | B60Q 3/14 |
| | | | 280/728.3 |
| 2009/0218793 A1* | 9/2009 | Kraus | B60R 21/21656 |
| | | | 280/728.3 |
| 2009/0273165 A1* | 11/2009 | Worrell | B60R 21/21656 |
| | | | 280/728.3 |
| 2009/0315306 A1* | 12/2009 | Worrell | B60R 21/21658 |
| | | | 280/731 |
| 2010/0102538 A1* | 4/2010 | Paxton | B60Q 3/64 |
| | | | 280/728.3 |
| 2010/0104780 A1* | 4/2010 | Paxton | B60R 21/215 |
| | | | 428/31 |
| 2010/0107806 A1* | 5/2010 | Corinaldi | B62D 1/046 |
| | | | 74/552 |
| 2010/0194080 A1* | 8/2010 | Paxton | B60Q 3/64 |
| | | | 280/728.3 |
| 2010/0201105 A1* | 8/2010 | Iwazato | B60R 21/201 |
| | | | 280/728.3 |
| 2011/0109066 A1* | 5/2011 | Rick | B60R 21/21656 |
| | | | 280/728.3 |
| 2011/0116251 A1* | 5/2011 | Rick | B60Q 3/68 |
| | | | 362/84 |
| 2011/0210534 A1* | 9/2011 | Sauer | B60R 21/215 |
| | | | 280/728.2 |
| 2012/0001406 A1* | 1/2012 | Paxton | B60R 13/005 |
| | | | 280/728.3 |
| 2013/0277952 A1* | 10/2013 | Jung | B60R 21/21656 |
| | | | 280/728.3 |
| 2014/0145419 A1* | 5/2014 | Ishikawa | B60R 21/215 |
| | | | 280/728.3 |
| 2014/0210190 A1* | 7/2014 | Bosch | B60R 21/203 |
| | | | 280/728.3 |
| 2014/0210191 A1* | 7/2014 | Bosch | B60Q 3/64 |
| | | | 280/728.3 |
| 2015/0116979 A1* | 4/2015 | Farkas | F21V 7/00 |
| | | | 362/23.14 |
| 2016/0001807 A1* | 1/2016 | Hans | B60R 11/0229 |
| | | | 345/173 |
| 2016/0025281 A1* | 1/2016 | Gardner | B62D 1/046 |
| | | | 362/516 |
| 2016/0121809 A1* | 5/2016 | Barros Alonso | B60R 21/21656 |
| | | | 280/728.3 |
| 2017/0369022 A1* | 12/2017 | Kanto | B60Q 1/0082 |
| 2018/0208111 A1* | 7/2018 | Lisseman | G02B 6/0088 |
| 2018/0244196 A1* | 8/2018 | Jablonski | B60Q 3/20 |
| 2019/0001879 A1* | 1/2019 | Ali | B60N 2/58 |
| 2019/0001880 A1* | 1/2019 | Schneider | B60Q 3/14 |
| 2019/0001901 A1* | 1/2019 | Verwys | B60R 13/005 |
| 2019/0071112 A1* | 3/2019 | Toddenroth | B60R 21/2032 |
| 2019/0322211 A1* | 10/2019 | Kim | B60Q 3/14 |
| 2019/0351860 A1* | 11/2019 | Ohki | B60R 13/005 |
| 2020/0164824 A1* | 5/2020 | Ide | B60R 21/21656 |
| 2020/0164825 A1* | 5/2020 | Ide | B60R 21/21656 |
| 2020/0172037 A1* | 6/2020 | Klaenhammer | B60R 11/0264 |
| 2020/0355867 A1* | 11/2020 | Kwon | B60Q 3/283 |
| 2020/0406848 A1* | 12/2020 | Kang | B60R 21/215 |
| 2021/0061189 A1* | 3/2021 | Fujimori | B60Q 3/283 |
| 2021/0107400 A1* | 4/2021 | Erler | B60R 13/02 |
| 2021/0362668 A1* | 11/2021 | Park | B60R 21/2165 |

* cited by examiner

DRIVER AIRBAG MODULE WITH LIGHTING DEVICE

CROSS REFERENCE TO RELATED APPLICATION

The present application claims priority to Korean Patent Application No. 10-2020-0118580, filed Sep. 15, 2020, the entire contents of which are incorporated herein for all purposes by this reference.

BACKGROUND OF THE INVENTION

Field of the Invention

The present disclosure relates to a driver airbag module with a lighting device. More particularly, the disclosure relates to a driver airbag module capable of preventing a lighting device from being damaged when a driver airbag installed in a steering wheel is deployed.

Description of the Related Art

An airbag device is essentially used for the safety of a passenger in a vehicle. In particular, a driver airbag for protecting the front of a driver is installed in a steering wheel.

Many vehicle manufacturers have emblems bearing their logos or trademarks on steering wheels. Such an emblem is disposed on the steering wheel in which the driver airbag is installed.

Recently, a technology for mounting a lighting device on the emblem mounted on the steering wheel has been developed for aesthetic effects and communication. In order to implement lighting in the emblem, a lens, a circuit, and a mounting structure should be mounted on a back of the emblem.

However, in the case of mounting the emblem including the lighting device on the steering wheel, additional load is applied when the driver airbag is deployed, thus there is a problem where the detachment of the lighting device occurs while an insert part of a cover through which the emblem passes is damaged.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a driver airbag module with a lighting device capable of preventing damage to and detachment of an emblem panel and a lighting device, even if a driver airbag in a steering wheel is deployed.

In order to achieve the objective of the present disclosure, the present disclosure provides a driver airbag module with a lighting device installed in a steering wheel of a vehicle, the driver airbag module including an inner cover extending in a direction of a plane parallel to the steering wheel and having an accommodation space recessed downwards; an emblem panel accommodated in the accommodation space to be disposed in an upper portion of the inner cover and integrally coupled with the inner cover; a lighting device accommodated in the accommodation space to be disposed between the emblem panel and the inner cover; and an outer cover extending in the direction of the plane parallel to the steering wheel and integrally coupled with an upper surface of the inner cover while covering the emblem panel and the inner cover.

The outer cover may cover an airbag device installed in the steering wheel.

A tear line may be formed on the outer cover to induce damage when the airbag device is deployed, and the outer cover may be partitioned into a plurality of sections by the tear line.

The inner cover may be coupled to the outer cover in one of the plurality of sections that are partitioned, and thereby may avoid the extended tear line.

The inner cover may be coupled to the steering wheel with a first end thereof being bent to an inside of the steering wheel in a plane where the inner cover extends.

The emblem panel may be fused, at a plurality of coupling positions disposed along an outer end thereof, to the inner cover with a first insert protrusion of the inner cover extending upwards being inserted into the accommodation space.

A flange part may be formed on the inner cover to surround the accommodation space, and the inner cover may be coupled to the outer cover while the flange part is in close contact with the outer cover.

The inner cover may be fused, at a plurality of coupling positions disposed to surround the accommodation space, to the outer cover with a second insert protrusion of the outer cover extending downwards being inserted into the flange part.

The emblem panel may include a projection projecting upwards, and the outer cover may include a through part formed so that the projection of the emblem panel is exposed to the outside.

The driver airbag module may further include a reinforcing panel extending in a direction of a plane parallel to the outer cover or the emblem panel, formed in a shape corresponding to a shape in which the projection projects or the through part is penetrated, and disposed between the outer cover and the emblem panel.

The lighting device may include a light emitting element that emits light in response to an inputted electrical signal, and a circuit board that is electrically connected to the light emitting element to input the electrical signal into the light emitting element.

The lighting device may further include a lens that is located above the light emitting element to disperse light emitted by the light emitting element to the emblem panel.

A driver airbag module with a lighting device according to the present disclosure is advantageous in that an emblem panel and the lighting device are protected by an inner cover and an outer cover, even if airbag deployment pressure is applied by the operation of an airbag device.

BRIEF DESCRIPTION OF THE DRAWINGS

The above and other objectives, features, and other advantages of the present disclosure will be more clearly understood from the following detailed description when taken in conjoint with the accompanying drawings, in which.

DETAILED DESCRIPTION OF THE INVENTION

Figure 1:
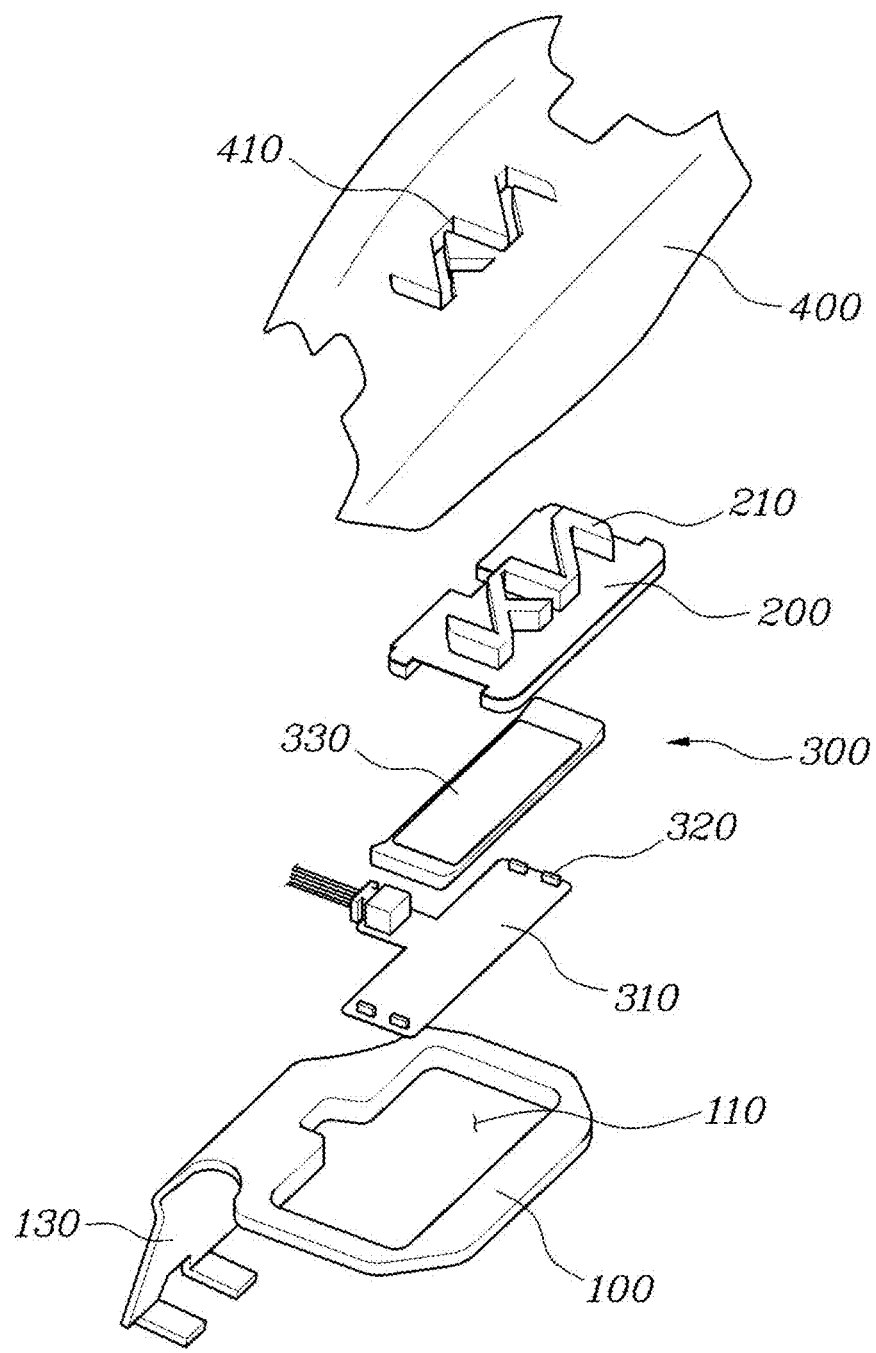
FIG. 1 is an exploded perspective view illustrating a driver airbag module with a lighting device in accordance with an embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application.

Since the present disclosure may be embodied in many different forms, particular embodiments will be illustrated in the drawings and be described in detail herein. However, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, the present disclosure will be explained in detail by describing exemplary embodiments of the present disclosure with reference to the accompanying drawings. The same reference numerals are used throughout the drawings to designate the same or similar components.

Figure 2:
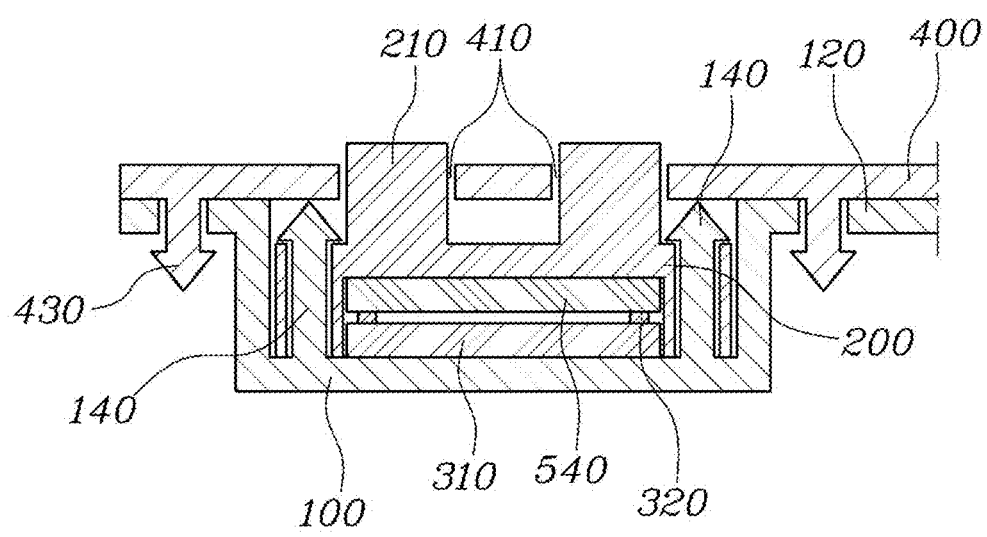
FIG. 2 is a sectional view illustrating the driver airbag module with the lighting device in accordance with the embodiment of the present disclosure.
Figure 2:
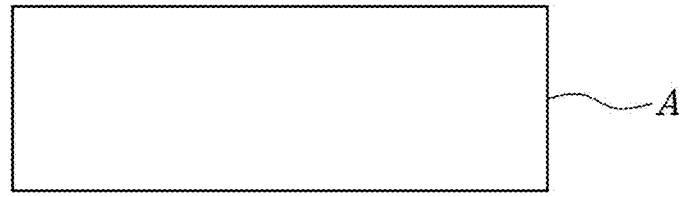
Figure 3:
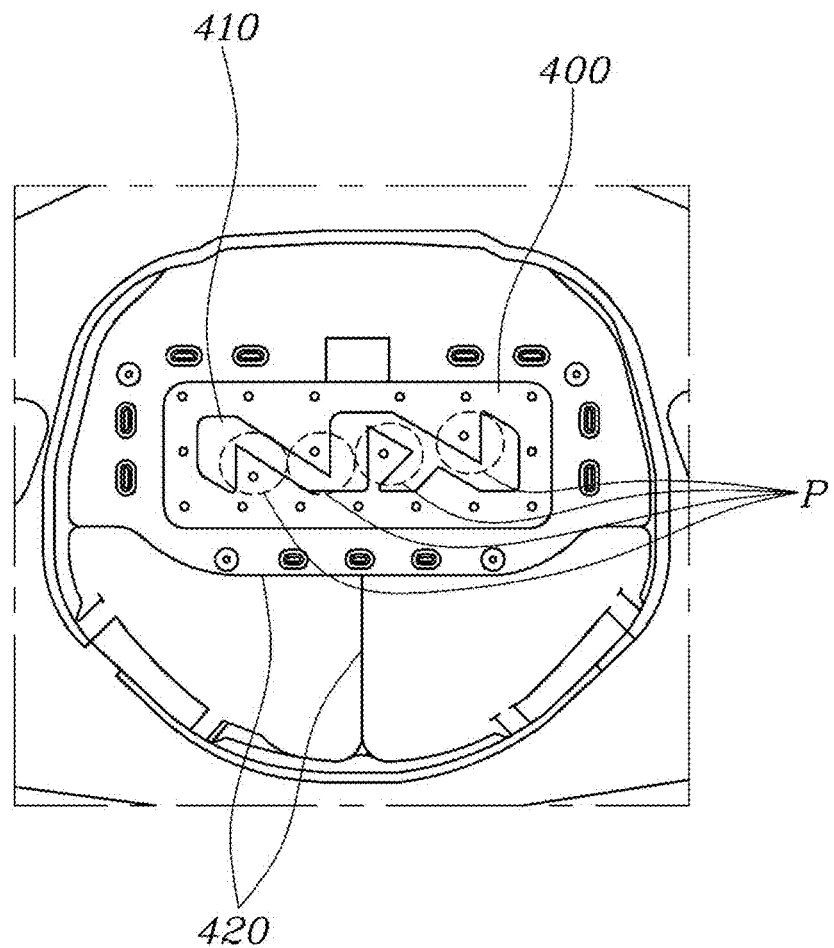
FIGS. 3 and 4 are rear views illustrating the driver airbag module with the lighting device in accordance with the embodiment of the present disclosure.
Figure 4:
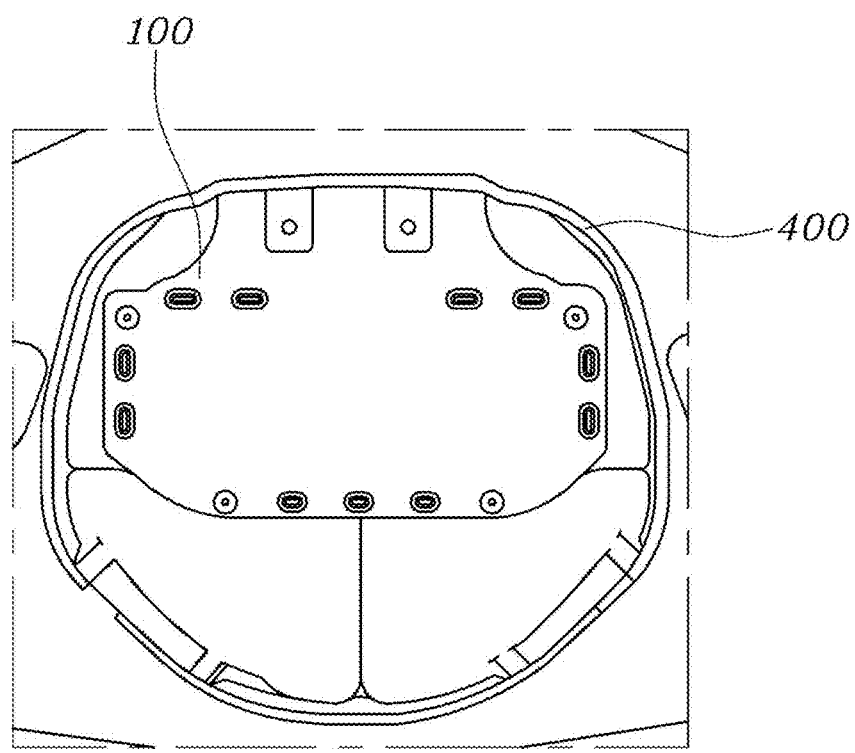

FIG. 1 is an exploded perspective view illustrating a driver airbag module with a lighting device 300 in accordance with an embodiment of the present disclosure, FIG. 2 is a sectional view illustrating the driver airbag module with the lighting device 300 in accordance with the embodiment of the present disclosure, and FIGS. 3 and 4 are rear views illustrating the driver airbag module with the lighting device 300 in accordance with the embodiment of the present disclosure.

Referring to FIGS. 1 to 4, the driver airbag module with the lighting device 300 in accordance with the embodiment of the present disclosure is the driver airbag module with the lighting device 300 installed in a steering wheel of a vehicle. The driver airbag module includes an inner cover 100 that extends in a direction of a plane parallel to the steering wheel and has an accommodation space 110 recessed downwards, an emblem panel 200 that is accommodated in the accommodation space 110 to be disposed in an upper portion of the inner cover 100 and is integrally coupled with the inner cover 100, a lighting device 300 that is accommodated in the accommodation space 110 to be disposed between the emblem panel 200 and the inner cover 100, and an outer cover 400 that extends in the direction of the plane parallel to the steering wheel and is integrally coupled with an upper surface of the inner cover 100 while covering the emblem panel 200 and the inner cover 100.

The inner cover 100 may be coupled to a housing of the steering wheel in a central portion located inside a rim of the steering wheel. As described later, a first end 130 of the inner cover that is bent downwards, i.e. to the inside of the steering wheel, may be coupled to the housing of the steering wheel, so that the inner cover may be rotated about the first end when the airbag device A is deployed.

The inner cover 100 may extend in the direction of the plane parallel to the steering wheel. In particular, the accommodation space 110 recessed downwards of the steering wheel may be formed in the inner cover 100. As described later, the emblem panel 200 and the lighting device 300 may be accommodated in the accommodation space 110.

The emblem panel 200 may be a panel extending in the direction of the plane where the inner cover 100 extends, and be disposed in the accommodation space 110 to be on the upper surface of the inner cover 100. In particular, the emblem panel 200 may have a shape for marking the logo, the symbol, or the trademark of a manufacturer.

The emblem panel 200 may be integrally coupled with the inner cover 100 on the upper surface of the inner cover 100.

The lighting device 300 may be located under the emblem panel 200, and be accommodated in the accommodation space 110 to be in the upper portion of the inner cover 100.

The outer cover 400 may extend in the direction of the plane where the inner cover 100 extends or in the direction of the plane parallel to the steering wheel. While the outer cover 400 is integrally coupled with the upper surface of the inner cover 100, the accommodation space 110 defined in the inner cover 100 may be covered.

In particular, the outer cover 400 may cover the emblem panel 200 and the lighting device 300 accommodated in the accommodation space 110. Thus, the emblem panel 200 and the lighting device 300 are fixed while being disposed between the inner cover 100 and the outer cover 400. Even if the airbag deployment pressure is applied by the operation of an airbag device A that will be described later, the emblem panel 200 and the lighting device 300 may be protected by the inner cover 100 and the outer cover 400.

The outer cover 400 may cover the airbag device A installed in the steering wheel. In other words, a driver airbag (DAB) installed in the steering wheel may be covered by the outer cover 400.

In an embodiment, the airbag device A may be located under the inner cover 100, and be deployed to avoid the inner cover 100 when the airbag device is activated. Thus, even if the airbag deployment pressure generated by the operation of the airbag device A acts on the inner cover 100, shocks acing on the emblem panel 200 and the lighting device 300 disposed between the inner cover and the outer cover 400 may be attenuated.

In particular, when the airbag device A is activated, the inner cover 100 may be rotated about the first end by the airbag deployment pressure, and thereby shocks acting on the emblem panel 200 and the lighting device 300 may be attenuated.

FIG. 3 illustrates the back of the outer cover 400, and FIG. 4 illustrates the back of the outer cover 400 to which the inner cover 100 is coupled. Referring to FIGS. 3 and 4, a tear line 420 may be formed on the outer cover 400 to induce damage when the airbag device A is deployed, and the outer cover 400 may be partitioned into a plurality of sections by the tear line 420.

To be more specific, the tear line 420 may be formed in the outer cover 400 to be torn by the airbag deployment pressure when the airbag device A is deployed. The tear line 420 may extend such a plane where the outer cover 400 extends is partitioned into a plurality of sections. An airbag cushion may be deployed between pieces of the outer cover 400 that is torn along the tear line 420.

The inner cover 100 may be coupled to the outer cover 400 in one of the plurality of sections that are partitioned, and thereby avoid the extended tear line 420. To be more specific, the inner cover 100 may be spaced apart from the tear line 420 so that the tear line 420 may not pass through the inner cover 100.

Thus, the inner cover 100 may be avoided such that the deployment pressure of the airbag cushion deployed through the tear line 420 is not directly applied. Thereby, damage to the emblem panel 200 and the lighting device 300 disposed in the accommodation space 110 may be prevented.

The inner cover 100 may be coupled to the steering wheel with the first end being bent to the inside of the steering wheel.

The first end of the inner cover 100 may extend into the steering wheel to be coupled to the housing of the steering wheel. When the airbag deployment pressure is applied to the inner cover 100, the inner cover may be rotated about the first end secured to the steering wheel, so that shocks caused by the deployment pressure may be reduced.

The emblem panel 200 may be fused, at a plurality of coupling positions disposed along an outer end thereof, to the inner cover 100 in a state where a first insert protrusion 140 of the inner cover 100 extending upwards is inserted into the accommodation space 110.

The first insert protrusion 140 may be formed on the inner cover 100, and extend upwards. Furthermore, a plurality of first insert protrusions 140 may be provided and disposed along the outer end of the emblem panel 200 in the accommodation space 110. Furthermore, in the state where the emblem panel 200 is inserted into the first insert protrusion 140 in the accommodation space 110, the end of the first insert protrusion 140 may be fused and the inner cover may be coupled to the emblem panel.

Thus, the emblem panel 200 may be firmly secured, at a plurality of positions along the outer end thereof, to the inner cover 100 so that the possibility of removing the emblem panel from the inner cover 100 may be reduced, and thereby the detachment possibility of the emblem panel may be reduced.

Furthermore, a flange part 120 may be formed on the inner cover 100 to surround the accommodation space 110, and may be coupled to the outer cover 400 while the flange part 120 is in close contact with the outer cover 400.

The flange part 120, which extends upwards from the outer edge of the accommodation space 110 and then is bent outwards, may be formed on the inner cover 100. The flange part 120 may extend in a direction parallel to the accommodation space 110 to be spaced apart from the accommodation space in a vertical direction.

The flange part 120 of the inner cover 100 may be coupled to the outer cover 400 while being in close contact with the outer cover 400. Thus, the inner cover 100 and the outer cover 400 are coupled while being in surface contact with each other, so that a coupling force is increased.

The inner cover 100 may be fused, at a plurality of coupling positions disposed to surround the accommodation space 110, to the outer cover 400 in a state where a second insert protrusion 430 of the outer cover 400 extending downwards is inserted into the flange part 120.

The second insert protrusion 430 of the outer cover 400 may extend from the outer cover 400 towards the inner cover 100, i.e. extend downwards. The inner cover 100 may be coupled to the outer cover 400 while being inserted into the second insert protrusion 430. In particular, the second insert protrusion 430 may be inserted into the flange part 120 of the inner cover 100, and may comprise a plurality of second insert protrusions to surround the accommodation space 110. Furthermore, the end of the second insert protrusion 430 may be inserted into and fused to the flange part 120 of the inner cover 100.

The emblem panel 200 may include a projection 210 projecting upwards, and the outer cover 400 may include a through part 410 formed so that the projection 210 of the emblem panel 200 is exposed to the outside.

The projection 210 is a part of the emblem panel 200 protruding upwards, and passes through the through part 410 to be exposed to the outside of the outer cover 400. Thus, the emblem panel 200 may increase aesthetic effect on the interior design of the vehicle.

The through part 410 may be formed to correspond to the shape of the projection 210 of the emblem panel 200, thus exposing the projection 210 to the outside.

Figure 5:
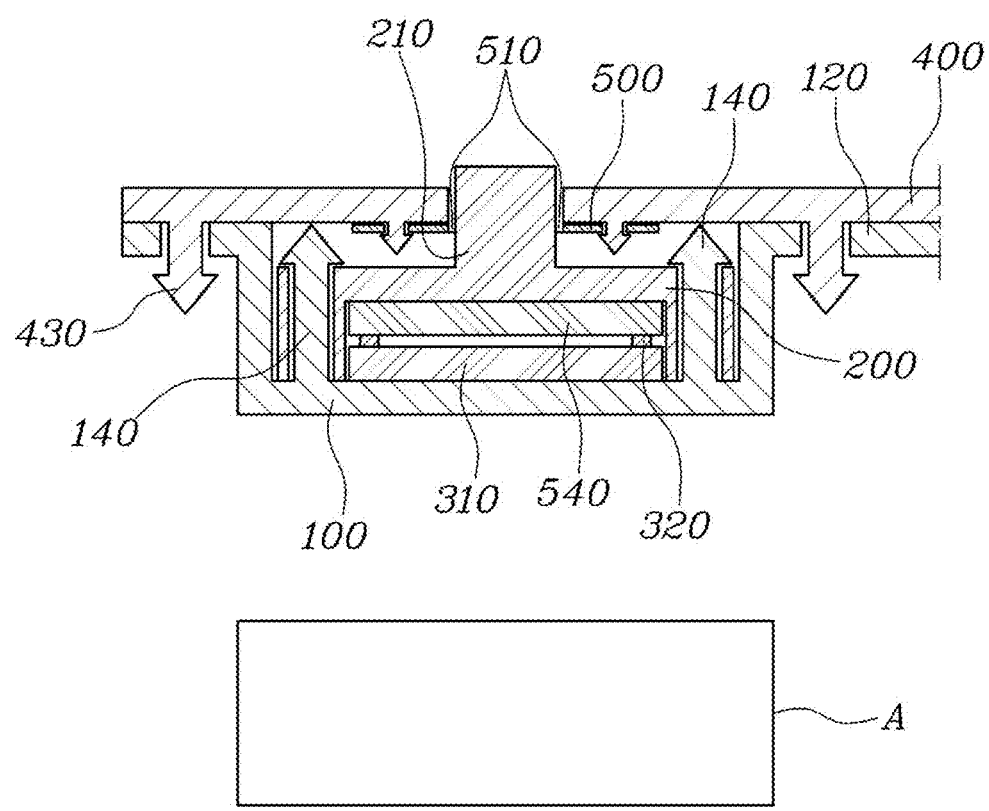
FIG. 5 is a sectional view illustrating a driver airbag module with a lighting device in accordance with another embodiment of the present disclosure.
Figure 6:
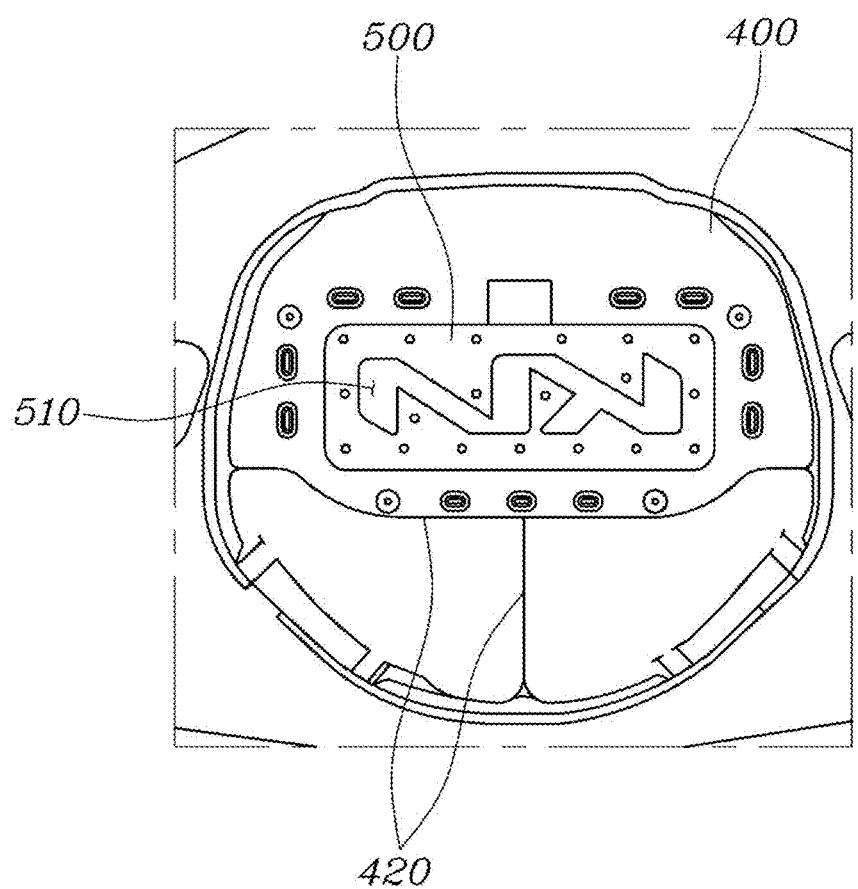
FIG. 6 is a rear view illustrating the driver airbag module with the lighting device in accordance with another embodiment of the present disclosure.

FIG. 5 is a sectional view illustrating a driver airbag module with a lighting device 300 in accordance with another embodiment of the present disclosure, and FIG. 6 is a rear view illustrating the driver airbag module with the lighting device 300 in accordance with another embodiment of the present disclosure.

Referring to FIGS. 5 and 6, the driver airbag module with the lighting device 300 in accordance with another embodiment of the present disclosure may further include a reinforcing panel 500 that extends in the direction of a plane parallel to an outer cover 400 or an emblem panel 200, is formed in a shape corresponding to a shape in which a projection 210 protrudes or a through part 410 is penetrated, and is disposed between the outer cover 400 and the emblem panel 200.

The through part 410 having the shape corresponding to that of the projection 210 may be especially vulnerable to damage at low strength points P shown in FIG. 3. The low strength points P may mainly occur at a point where the projection 210 is bent, particularly the projection is bent while forming an acute angle.

Since the through part 410 may be deformed or damaged at the low strength point P, the reinforcing panel 500 may be further inserted.

The reinforcing panel 500 may include a penetration part 510 formed in a shape corresponding to the shape in which the projection 210 protrudes or the through part 410 is penetrated, and may be disposed between the outer cover 400 and the emblem panel 200. In other words, the reinforcing panel 500 may be placed on the upper surface of the emblem panel 200, and be placed on the lower surface of the outer cover 400.

In an embodiment, the reinforcing panel 500 extends in a direction parallel to the outer cover 400 or the emblem panel 200 to cover only the projection 210 inside the emblem panel 200, so that the reinforcing panel may extend to the outside of the emblem panel 200.

The lighting device 300 may include a light emitting element 320 that emits light in response to an inputted electrical signal, and a circuit board 310 that is electrically connected to the light emitting element 320 to input the electrical signal into the light emitting element 320.

The circuit board 310 may be supplied with the electrical signal and power from an external device through a cable. The circuit board 310 may be a PCB on which a circuit is printed.

The light emitting element 320 may be electrically connected to the circuit board 310 to emit light by the electrical signal and the power. In an embodiment, the light emitting element 320 may be an LED device.

The light emitting element 320 may be formed to extend in the direction of the plane parallel to the circuit board 310, and may be biased on one side to emit light towards the central portion.

The lighting device 300 may further include a lens 330 that is located above the light emitting element 320 to disperse light emitted by the light emitting element 320 to the emblem panel 200.

The lens 330 may disperse light that is incident from the light emitting element 320, so that it is possible to uniformly transmit light to the entire emblem panel 200. In particular, the lens 330 may evenly disperse light, incident from the light emitting element 320 that extends in the direction of the plane parallel to the emblem panel 200 and is biased on one side, to the entire emblem panel 200.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A driver airbag module positioned in a steering wheel of a vehicle, comprising:
    an inner cover extending parallel to the steering wheel and having an accommodation space recessed downwards;
    an emblem panel accommodated in the accommodation space, positioned at an upper portion of the inner cover, and coupled with the inner cover;
    a lighting device accommodated in the accommodation space and positioned between the emblem panel and the inner cover; and
    an outer cover extending parallel to the steering wheel and coupled with an upper surface of the inner cover while covering the emblem panel and the inner cover,
    wherein the emblem panel is fused, at a plurality of coupling positions disposed along an outer end thereof, to the inner cover having a first insert protrusion extending upwardly and inserted into the accommodation space.

2. The driver airbag module of claim 1, wherein the inner cover is coupled to the steering wheel and includes a first end bent downwardly.

3. The driver airbag module of claim 1, wherein the outer cover covers an airbag device installed in the steering wheel.

4. The driver airbag module of claim 3, wherein the outer cover has a tear line that partitions the outer cover into a plurality of sections.

5. The driver airbag module of claim 4, wherein the inner cover is coupled to one of the plurality of sections of the outer cover without overlapping the tear line.

6. The driver airbag module of claim 1, wherein a flange part is formed on the inner cover to surround the accommodation space, and the inner cover is coupled to the outer cover while the flange part is in close contact with the outer cover.

7. The driver airbag module of claim 6, wherein the inner cover is fused, at a plurality of coupling positions disposed to surround the accommodation space, to the outer cover with a second insert protrusion of the outer cover extending downwards being inserted into the flange part.

8. The driver airbag module of claim 1, wherein the emblem panel comprises a projection projecting upwards, and the outer cover comprises a through part formed so that the projection of the emblem panel is exposed to the outside.

9. The driver airbag module of claim 8, further comprising:
    a reinforcing panel extending parallel to the outer cover or the emblem panel, formed in a shape corresponding to a shape in which the projection projects or the through part is penetrated, and disposed between the outer cover and the emblem panel.

10. The driver airbag module of claim 1, wherein the lighting device comprises:
    a light emitting element that emits light in response to an inputted electrical signal; and
    a circuit board that is electrically connected to the light emitting element to input the electrical signal into the light emitting element.

11. The driver airbag module of claim 10, wherein the lighting device further comprises a lens that is located above the light emitting element to disperse the light emitted by the light emitting element to the emblem panel.

* * * * *